UNITED STATES PATENT OFFICE.

GUSTAV DEIKMAN, OF LIMA, OHIO.

LINIMENT.

SPECIFICATION forming part of Letters Patent No. 307,748, dated November 11, 1884.

Application filed March 24, 1884. (No specimens.)

*To all whom it may concern:*

Be it known that I, GUSTAV DEIKMAN, a citizen of the United States, residing at Lima, in the county of Allen and State of Ohio, have invented a certain new and useful improvement in chemical composition for the alleviation and cure of pain and reducing of swellings and enlargements of parts in cases of acute and chronic rheumatism and other local maladies of similar nature, of which the following is a specification.

My composition consists of the following ingredients, combined in the proportions stated, viz: alcohol, one quart; aqua ammonia, one pint; glycerine, one ounce; borax, one and a half ounce; chloroform, one ounce; ether, one and a half ounce; oil of sassafras, three ounces; beef's gall, eight ounces; soft water, one pint; sal-soda, one ounce; castile-soap, three pounds; oil of roses, one and a half ounce. These ingredients are to be mingled and thoroughly mixed and blended by agitation and heat until the desired consistence of paste or form of hard soap is obtained.

In using the above-described composition, add enough alcohol or spirits to soften it. Then apply to or over the parts affected by rubbing in with the hand until it is absorbed by the pores, repeating the applications till the desired effect is produced.

I do not claim that use of many of the above-named ingredients has not before been made, but am not aware, nor do I believe, that they have ever, all of them, been combined in the same or like proportions for any use.

What I claim, and for which I desire to obtain Letters Patent of the United States, is—

The hereinabove-described composition of ingredients for the alleviation of pain and reducing of swellings and enlargements of parts of the human body in acute and chronic cases of rheumatism and other local maladies of like character, consisting of alcohol, ammonia, glycerine, borax, chloroform, ether, oil of sassafras, beef's gall, water, sal-soda, soap, and oil of roses, in the proportions specified.

GUSTAV DEIKMAN.

Witnesses:
SAMUEL WOOD, Jr.,
JOHN McKIBBEN.